United States Patent Office 3,176,536
Patented Apr. 6, 1965

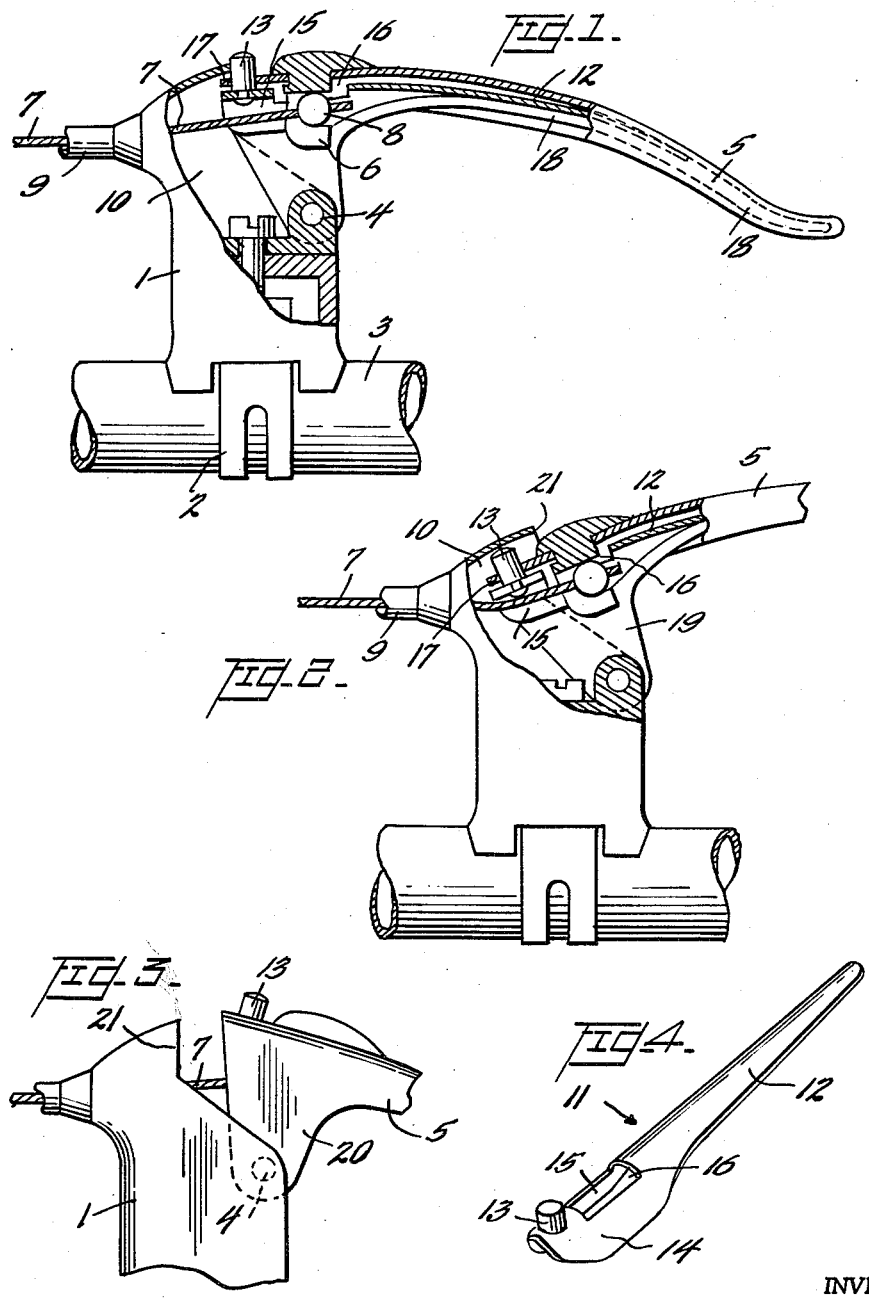

3,176,536
BRAKE OPERATING HANDLE DEVICE
Karl Altenburger, Jestetten, Baden, Germany
Filed Mar. 25, 1963, Ser. No. 267,860
Claims priority, application Switzerland, Nov. 13, 1962,
13,337/62
5 Claims. (Cl. 74—489)

This invention relates to a hand-operated Bowden control for vehicles provided with a handle-bar, having a bearing support attached to the handle-bar together with a hollow handlever which is rockably mounted with respect thereto and holds the Bowden cable, whereby, between a bearing support and the handlever, there is arranged a member which is manually adjustable and adadapted to alter the rocking angle between the handlever and the bearing support.

There have been devised several such Bowden controls, in which, with a hand-operated member, the Bowden cable can be longitudinally moved with respect to the bearing support, to permit, for instance, of opening the brake jaws of a rim brake wider when changing a wheel, or of more conveniently removing and inserting the Bowden cable of a brake and coupling.

It is already known to have the spring-loaded member designed and arranged in such a way that, independent of the momentary position of the member, a brake or a coupling can be actuated by means of the Bowden control, the member automatically takes up such a position relative to the handlever and bearing support, that the position of the handlever to the bearing support is established in which, upon actuation of the handlever, the brake or coupling becomes effective almost immediately.

In all these Bowden controls, the structural design of the bearing support and the handlever was essentially influenced by the member. Thus, partly, a separate pin for a spring-loaded pivoted pawl had to be provided and accommodate either on the bearing support or on the handlever, or the bearing support and the handlever were designed at the expense of an aesthetic form so as to permit of conveniently arranged and actuating the member.

The problem underlying the invention consists in having the member to be actuated against spring action, itself designed very simple and cheap and arranged on an aesthetically shaped bearing support and handlever so that the member does not appreciably impair either the form or appearance of the bearing support and the handlever. Thereby the Bowden control has to be effective independent of the position of the member and the handlever can be brought into an almost immediately operative position.

According to the invention, the Bowden control is characterized in that the member is an oblong leaf spring partly inserted into the hollow space of the handlever, with a cam which is fixed to the non-inserted portion and is displaceable in an opening of the handlever wall with the action of the leaf spring into an end position in which it forms a stop for the bearing support, and against the action of the leaf spring into a further end position, in which it does not form a stop for the bearing support.

Further features of the invention will appear from the following description and claims, taken in conjunction with the accompanying drawing, wherein there is shown, by way of example, one preferred form of embodiment incorporating the invention.

In said annexed drawing:

FIG. 1 is a side elevation partly in section of a Bowden control in immediate readiness for working;

FIG. 2 is a side elevation partly in section of the Bowden control, in a position when changing a wheel or mounting a Bowden cable;

FIG. 3 is a side elevation of the actuated Bowden control; and

FIG. 4 is a perspective view of a member.

Referring to FIG. 1, the bearing support 1 is mounted on the handle-bar 3 by means of a pipe clamp 2. The bearing eye 4 of the support 1 has rockably supported thereon an arcuate handlever 5 with its side walls 19, 20. By means of a hook 6 mounted within the handlever, a Bowden cable is secured with its nipple 8. A cowl 9 of a cable 7 rests against the bearing support 1.

The handle 5 and the bearing support 1 are hollow, and the handle 5 can be partially rotated into the hollow space 10 of the bearing support 1 (FIG. 2).

The member 11 consists of a leaf spring 12 and a pin or abutment 13 (FIG. 4) attached thereto. The portion of the leaf spring 12 lying in the vicinity of the pin 13 is of curved cross-section. The lobes 14, 15 of the member 11 are formed substantially at right angles to the section of the leaf spring 12 (FIG. 4). In relaxed condition, the leaf spring 12 is substantially stretched, i.e. straight (FIG. 4). The leaf spring 12 has a slot 16 therein, through which the hook 6 protrudes holding the nipple 8. The pin 13 is a cylindrical member riveted into the leaf spring 12.

In the handlever 5 there is a bore 17 for the pin 13, and the bearing support 1 has an edge 21 against which the pin can abut (FIG. 1). The handlever 5 includes in its entire length a hollow space 18. In the form shown, the handlever 5 is formed of sheet light-metal; but it could also be cast hollow (FIG. 1).

The member 11 (FIG. 4) is pushed into the hollow handlever 5 and thereby the leaf spring 12 is bent according to the curved shape of the handlever 5 and is given initial tension. The member 11 lying on the inner side of the handlever 5 is guided with its lobes 14, 15 on the inner sides of the sidewalls 19, 20 of lever 5. The member 11 is pushed into handlever 5 until the pin 13 snaps into the bore 17. The portion of the member 11 carrying the pin 13 and lobes 14, 15, is not pushed into the hollow space 18 of handlever 5, since it lies between the sidewalls 19, 20 of handlever 5.

Member 11 is provided embedded with initial tension within the handlever 5 so that the pin 13 protrudes outwards through the handlever wall.

By finger pressure the pin 13 can be displaced within the bore 17 against the action of the already initially tensioned member 11, whereby the latter with its lobes 14, 15 is displaceably guided between the sidewalls 19, 20 of handlever 5. With Bowden control in the position of FIG. 1 pin 13 abuts on the edge 21 of the bearing support 1 (FIG. 1). If the handlever 5 has to be rocked still more into the bearing support 1 when changing a wheel or when mounting the Bowden cable 7, by finger pressure the pin 13 is pressed back so far into the interior of the handlever 5 that the pin 13 lies below the edge 21 and can enter the hollow space 10 of the bearing support 1 (FIG. 2).

Also from the position of the handlever 5 according to FIG. 2 the Bowden control is fully effective; the handlever 5 must only be moved through a greater angle with respect to the bearing support than from the position according to FIG. 1, in order to reach the position according to FIG. 3.

The member can be simply built into and removed from the handle and no special means for fastening it on the handlever 5 are required. The usual form of the handlever 5 is utilized for fastening the member, and serves at the same time for initially tensioning the member 11. Member 11 lies within the handlever; it does not interfere with its preferred, handy and aesthetic form. The member 11 itself is of simple design, needing no attendance and practically without wear, inasmuch as its leaf spring 12 may be made fairly long in accordance with the usual handlever 5, hence has a slight elastic deformation owing to the insertion into the handlever 5, as well as when the pin 13 is actuated.

Should a straight handlever be used as a Bowden control, instead of the curved handlever 5, then for instance a bent or waved form is imparted to the leaf spring in the relaxed condition, so that the member is again held with elastic deformation within the hollow handle.

What I claim is:

1. A brake operating handle device for a handle-bar of a vehicle comprising a support adapted to be fixed on the handle-bar at one end and having an edge portion at the other end of the support, a hand lever rotatably mounted on a pivot on the support and having a hollow space therein, and a member in the hand lever and having a leaf spring section at one end projecting into and bearing in the hollow space in the hand lever and an abutment secured on the other end of the member, said abutment abutting against the edge portion of the support in a normal position of non-braking action.

2. A brake operating handle device according to claim 1, in which the hand lever has an opening therein through which the abutment projects.

3. A brake operating handle device according to claim 1, in which the hand lever has an opening therein through which the abutment projects, and has a further opening in which an operating means for the brake projects and is secured therein.

4. A brake operating handle device according to claim 1, in which the leaf spring section comprises one end portion and the remaining portion of the member is rigid.

5. A brake operating handle device according to claim 1, in which the hand lever is curved with the leaf spring section bearing against the curved inner wall.

References Cited by the Examiner
FOREIGN PATENTS 1,057,476  10/53  France.

BROUGHTON G. DURHAM, *Primary Examiner.*

MILTON KAUFMAN, *Examiner.*